(12) United States Patent
Marupaduga et al.

(10) Patent No.: US 10,085,220 B1
(45) Date of Patent: Sep. 25, 2018

(54) RADIO TRANSMIT POWER ADJUSTMENT BASED ON MULTIPLE RADIO FREQUENCY PATHS AND SOURCES OF INSERTION LOSS

(71) Applicant: Sprint Spectrum L.P., Overland Park, KS (US)

(72) Inventors: Sreekar Marupaduga, Overland Park, KS (US); Ahmad Saleh, Rochester Hills, MI (US)

(73) Assignee: Sprint Spectrum L.P., Overland Park, KS (US)

( * ) Notice: Subject to any disclaimer, the term of this patent is extended or adjusted under 35 U.S.C. 154(b) by 64 days.

(21) Appl. No.: 15/294,315

(22) Filed: Oct. 14, 2016

(51) Int. Cl.
| | |
|---|---|
| *H04L 12/50* | (2006.01) |
| *H04W 52/28* | (2009.01) |
| *H04L 12/801* | (2013.01) |
| *H04W 36/06* | (2009.01) |
| *H04W 88/08* | (2009.01) |
| *H04W 88/12* | (2009.01) |

(52) U.S. Cl.
CPC .............. *H04W 52/28* (2013.01); *H04L 47/29* (2013.01); *H04W 36/06* (2013.01); *H04W 88/085* (2013.01); *H04W 88/12* (2013.01)

(58) Field of Classification Search
CPC ........................................................ H04L 12/50
USPC .......................................................... 370/329
See application file for complete search history.

(56) References Cited

U.S. PATENT DOCUMENTS

2017/0359106 A1* 12/2017 Wilson ................ H04B 17/318

* cited by examiner

*Primary Examiner* — Dang Ton

(57) ABSTRACT

Disclosed is a method and system for compensating for excessive attenuation on an RF connection between a remote radio head (RRH) and an antenna of cell site. In an example configuration, in which first and second RF carriers of a cell site traverse different RF paths between respective RRHs and respective antenna, the second RF carrier may be subject to more attenuation than the first. Consequently, antenna transmission power of the second RF carrier may be below one or another threshold. For communication services to user equipment devices that involve both the first and second RF carriers, the diminished antenna transmission power of the second RF carrier may cause service degradation. In accordance with example embodiments, a controlling network entity may determine that the power is diminished, and responsively reallocate transmission power from an underutilized carrier to the second carrier, thereby boosting its transmission power and remediating service degradation.

20 Claims, 10 Drawing Sheets

RADIO TRANSMIT POWER ADJUSTMENT BASED ON MULTIPLE RADIO FREQUENCY PATHS AND SOURCES OF INSERTION LOSS

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas in which user equipment devices (UEs) such as cell phones, tablet computers, tracking devices, embedded wireless modules, and other wirelessly equipped communication devices (whether or not technically operated by a human user), can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In general, a cellular wireless network may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover of UEs between coverage areas, and functions related to air interface communication.

A typical cell site of a cellular wireless network may be configured to provide one or more respective wireless coverage areas such as a cell or cell sectors in which to serve UEs. In practice, each cell site may include a respective antenna configuration, as well as respective supporting cell site equipment, which may be coupled in turn with network infrastructure such as routers, switches, gateways, and the like.

With this arrangement, when the supporting cell site equipment receives from the network infrastructure data that is to be transmitted in a wireless coverage area, or the supporting cell site equipment itself generates such data for transmission, the supporting equipment may convert the data into a form suitable for transmission by the antenna configuration, and the antenna configuration may then output the data over the air in the wireless coverage area. For instance, the supporting equipment may encode the data and modulate the encoded data on a radio frequency (RF) carrier, the supporting equipment may then pass the modulated carrier to the antenna configuration for RF transmission, and the antenna configuration may then wirelessly output the modulated carrier.

Likewise, when the antenna configuration wirelessly receives from within such a coverage area a modulated RF carrier representing data, the antenna configuration may pass that modulated RF carrier to the supporting cell site equipment, and the supporting equipment may then process that communication to uncover the underlying data. For instance, the supporting equipment may demodulate the RF carrier to uncover encoded data and may then decode the encoded data to uncover the underlying data. The supporting equipment may then handle the data locally or pass the data along to the network infrastructure for handling, as appropriate.

OVERVIEW

In a representative cellular wireless network or wireless communication system, the antenna configuration of each cell site may be arranged to provide a number of discrete but partly overlapping sectors as separately defined wireless coverage areas, such as three sectors for instance. To facilitate this, the antenna configuration may include for each sector a number of antennas or antenna systems, such as dipole antennas or antenna array elements, in a configuration that functions to provide a separate radiation pattern per sector. For instance, the antenna configuration of a cell site could be configured to provide roughly omnidirectional coverage by radiating to define three 120-degree sectors. Further, the antenna configuration for each sector could be arranged to support multiple input/multiple output (MIMO) service by applying multiple antennas or antenna elements. For instance, a sector could provide "8T8R MIMO" by having eight antennas each functioning to transmit and receive, "4T4R" MIMO by having four antennas each functioning to transmit and receive, or "2T2R" MIMO by having two antennas each functioning to transmit and receive.

In addition, each cell site may be configured to provide coverage on a number of RF carriers. Each such carrier could be defined by government regulation to span a particular range of frequency in the RF spectrum. For example, an RF carrier might span 5 MHz, 10 MHz, or 15 MHz, around a center frequency in a defined band, such as the 800 MHz band, the 1.9 GHz band, or the 2.5 GHz band. Each such carrier could be a frequency division duplex (FDD) carrier in which separate ranges of frequency are used for downlink communication from the cell site to UEs and for uplink communication from UEs to the cell site, or a time division duplex (TDD) carrier in which a common range of frequency is multiplexed over time for downlink and uplink use.

Further, a cell site may be configured to support multiple air interface and access technologies. For example, a cell site may support CDMA on one or more carriers, while supporting LTE on one or more other carriers. Each RF carrier may correspond to a respective RF channel, such that each RF channel provides separate support for LTE service or CDMA service. Support for other air interface technologies is possible as well.

In a typical arrangement, each of a cell site's carriers may be used in each of the cell site's sectors, so as to define effectively a multiple of discrete wireless coverage areas, each being within a given sector and being on a given carrier. For instance, if the cell site antenna configuration is arranged to provide three discrete sectors and the cell site operates on three carriers, the cell site may effectively provide nine separate coverage areas, three on each carrier. Of course, variations from this arrangement may be possible as well. For instance, a cell site could be arranged with its sectors having different carrier allocations. Further, a given cell site can be configured to support multiple channels, so as to effectively provide multiple overlapping coverage areas in a single geographic location. As noted, different coverage areas of the cell site could also be distinguished according to CDMA, LTE, or other air interface technologies.

The supporting equipment of a cell site may include equipment that enables the cell site to communicate discretely in each of its wireless coverage areas, so as to facilitate separate operation of each wireless coverage area, RF channel frequency (carrier), and/or air interface technology. To facilitate this, the supporting equipment of a cell site may include a baseband digital unit (BBU) and one or more remote radio heads (RRHs), with the baseband unit being configured to encode/decode data on a per coverage area basis, and each RRH being configured to modulate/demodulate encoded data on a per coverage area basis and including a power amplifier to amplify output transmissions per coverage area.

In practice, a cell site's baseband unit may be coupled with the network infrastructure and may take the form of a shelf unit holding one or more channel cards, one channel card for each carrier on which the cell site is configured to operate, with each channel card including logic modules (e.g., circuitry and/or one or more programmed processing units) to separately provide baseband unit functionality such as encoding/decoding for each sector of the cell site. Thus, if the cell site is to provide service on two carriers and has three sectors, then the baseband unit may include two channel cards, with each channel card having modules for separately serving the three sectors of the cell site. Each channel card may further be configured or designed for operation according to a specific air interface technology, such as LTE or CDMA. In an example cell arrangement, the baseband unit could be situated at the base of an antenna tower, if a tower is provided. In an alternative cell arrangement, the BBU may be located remotely from the geographical location of the cell site and or cell tower (or towers).

Each RRH may then be situated near the antenna configuration or antenna system(s), such as at a tower top, and may be coupled by a multi-fiber cable with the channel card(s) of the baseband unit. Further the RRH may include a number of antenna ports (e.g., mini-DIN ports) for coupling the RRH by an RF-transmission medium such as one or more coaxial cables with cell site antennas by way of some number of corresponding ports on the antenna system (s). And the RRH may include logic (e.g., circuitry and/or one or more programmed processing units) to provide RRH functionality such as modulation/demodulation and power amplification for the cell site, interfacing between the cell site's baseband unit and the cell site's antennas. Separation of the BBU from the RRH, whether in a local or remote configuration, also facilitates incremental expansion of a cell site's service capacity to meet growing demand, by enabling additional antenna systems and/or RRHs that add channels of one or another technology.

With this arrangement, in practice, when the cell site's baseband unit receives or generates data to be transmitted by the antennas of a given wireless coverage area of the cell site (e.g., a given sector on a given carrier), the baseband unit may apply its logic to encode the data, such as by applying constellation coding or the like to produce code symbols representing the data, and the baseband unit may then pass the resulting symbols to an RRH that is serving the wireless coverage area. The RRH may then modulate the symbols onto an RF carrier according to a given air interface technology and transmit the RF carrier to the wireless coverage area's antennas for wireless transmission in the coverage area. Likewise, when the wireless coverage area's antennas receive a modulated RF carrier from within the coverage area, the RRH that serves that coverage area may receive and demodulate the carrier to uncover code symbols and may pass those code symbols to the baseband unit, and the baseband unit may then decode the symbols to uncover the underlying data.

In a representative implementation, each RRH may include a plurality of antenna ports and may be configurable in various arrangements for coupling with the antennas of the cell site's sectors. For instance, and without limitation, an RRH may include eight antenna ports, and the RRH may be configurable to use those for serving one or more of the cell site's sectors, with the RRH's logic then functioning to interface accordingly between the connected sector(s) and the baseband unit's channel card(s).

For example, an eight-port RRH could serve a single eight-antenna sector, with all of the RRH ports being coupled with the antennas of that one sector, in which case three RRHs would be needed to serve all of the sectors of a three-sector cell site. As another example, an eight-port RRH could be logically split into four two-port units and could serve three two-antenna sectors, with two RRH ports being coupled with each sector's antennas, in which case one RRH would be needed to serve the a three-sector cell site, leaving two ports of the RRH unused (e.g., connected with a dummy load). And as yet another example, each of two eight-port RRHs could each be logically split into two four-port units and could serve three four-antenna sectors, with four ports of one of the RRHs being left unused (e.g., connected with a dummy load).

In some configurations, an RRH may have more ports than an antenna system to which it connects. To facilitate connections that take full advantage of all RRH ports in such a case, various ports of the RRH may be connected together by way of a combiner that outputs their combined input signals, thereby reducing the number required connections at the antenna system. For example, if the RRH has eight ports and the antenna system has four ports, then four 2×1 combiners may be used to combine four pairs of RRH ports into four connections that then match the number of antenna ports. Other configurations of combiners may be used as well, some of which may include cascading combiners between various RRH ports and antenna ports.

While the use of combiners can adapt a mismatch between the number of ports on an RRH and the number on an antenna system, intervening combiners may also introduce insertion loss into one or more of the paths between the RRH and the antenna system. As a result, transmission power at the antenna serving a channel that traverses such a path may be attenuated more than it otherwise would for a direct path from an RRH port to an antenna port. In certain communication scenarios between a cell site and a UE that involve more than one channel, the added attenuation suffered by a channel that traverses a path that includes one or more combiners can have adverse effects, particularly when one of the channels suffers more attenuation than another.

Non-limiting examples of such communication scenarios include carrier aggregation, in which a UE is served concurrently by two different channels, and handover between overlapping coverage areas of two different channels. If one of two channels used in carrier aggregation suffers significantly more attenuation than the other, a UE may not be able to detect it with sufficient strength to derive meaningful (if any) gain from aggregating the channels. And if one of two channels serving overlapping cells or sectors with different RF carriers suffers significantly more attenuation than the other, UEs—particularly those in positions near the outer edges of the cells or sectors—may tend to handover from the weaker (more attenuated) signal to the stronger signal. This could lead to unequal load distribution among cells or sectors of a cell site, and degraded overall performance of the system. It would therefore be desirable to be able to determine when unbalanced attenuation between channels occurs or exists, and compensate for potential deleterious effects.

Disclosed herein is a method and system for determining when attenuation of one channel of a cell site is more than a threshold greater than that of another channel, and responsively identifying one or more possibly underutilized channels that can be removed from service (at least temporarily) so as to free up additional transmission power for allocation to the excessively attenuated channel. Doing so can help compensate for the excessive attenuation, and thereby offset or avoid problems that might otherwise arise.

Accordingly, in one respect, disclosed is a method in a cell site of a wireless communication system, the cell site including (i) a first remote radio head (RRH) connected by a first radio frequency (RF) path to a first antenna system and (ii) a second RRH connected by a second RF path to a second antenna system, wherein the first RF path supports a first plurality of RF channels for air-interface communications with one or more user equipment device (UEs) via the first antenna system, and the second RF path supports a second plurality of RF channels for air-interface communications with one or more UEs via the second antenna system, the method comprising: making a determination that attenuation of antenna transmission power of a particular channel of the second plurality of RF channels exceeds attenuation of antenna transmission power of a particular channel of the first plurality of RF channels by more than a difference threshold; in response to the determination, identifying one or more other channels of the second plurality of RF channels for which capacity loading for serving UEs is below a utilization threshold; removing the identified one or more other channels from service; and at the second RRH, redistributing transmission power of the removed one or more other channels to the particular channel of the second plurality of RF channels to boost the transmission power of the particular channel of the second plurality of RF channels.

In another respect, disclosed is a cell site of a wireless communication system, the cell site comprising: a first antenna system; a second antenna system; a first remote radio head (RRH) connected by a first radio frequency (RF) path to the first antenna system, wherein the first RF path supports a first plurality of RF channels for air-interface communications with one or more user equipment device (UEs) via the first antenna system; a second RRH connected by a second RF path to the second antenna system, wherein the second RF path supports a second plurality of RF channels for air-interface communications with one or more UEs via the second antenna system; one or more processors, and memory storing instructions that, when executed by the one or more processors, cause the cell site to carry out operations including: making a determination that attenuation of antenna transmission power of a particular channel of the second plurality of RF channels exceeds attenuation of antenna transmission power of a particular channel of the first plurality of RF channels by more than a difference threshold; in response to the determination, identifying one or more other channels of the second plurality of RF channels for which capacity loading for serving UEs is below a utilization threshold; removing the identified one or more other channels from service; and at the second RRH, redistributing transmission power of the removed one or more other channels to the particular channel of the second plurality of RF channels to boost the transmission power of the particular channel of the second plurality of RF channels.

Still further, disclosed is a base station of a wireless communication system, the base station comprising: a first communication interface to a first remote radio head (RRH) connected by a first radio frequency (RF) path to a first antenna system of a cell site, wherein the first RF path supports a first plurality of RF channels for air-interface communications with one or more user equipment device (UEs) via the first antenna system; a second communication interface to a second RRH connected by a second RF path to a second antenna system of the cell site, wherein the second RF path supports a second plurality of RF channels for air-interface communications with one or more UEs via the second antenna system; one or more processors, and memory storing instructions that, when executed by the one or more processors, cause the base station to carry out operations including: making a determination that attenuation of antenna transmission power of a particular channel of the second plurality of RF channels exceeds attenuation of antenna transmission power of a particular channel of the first plurality of RF channels by more than a difference threshold; in response to the determination, identifying one or more other channels of the second plurality of RF channels for which capacity loading for serving UEs is below a utilization threshold; issuing an instruction to cause the second RRH to remove the identified one or more other channels from service; and instructing the second RRH to redistribute transmission power of the removed one or more other channels to the particular channel of the second plurality of RF channels to boost the transmission power of the particular channel of the second plurality of RF channels.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only and that numerous variations are possible.

DETAILED DESCRIPTION

Figure 1:
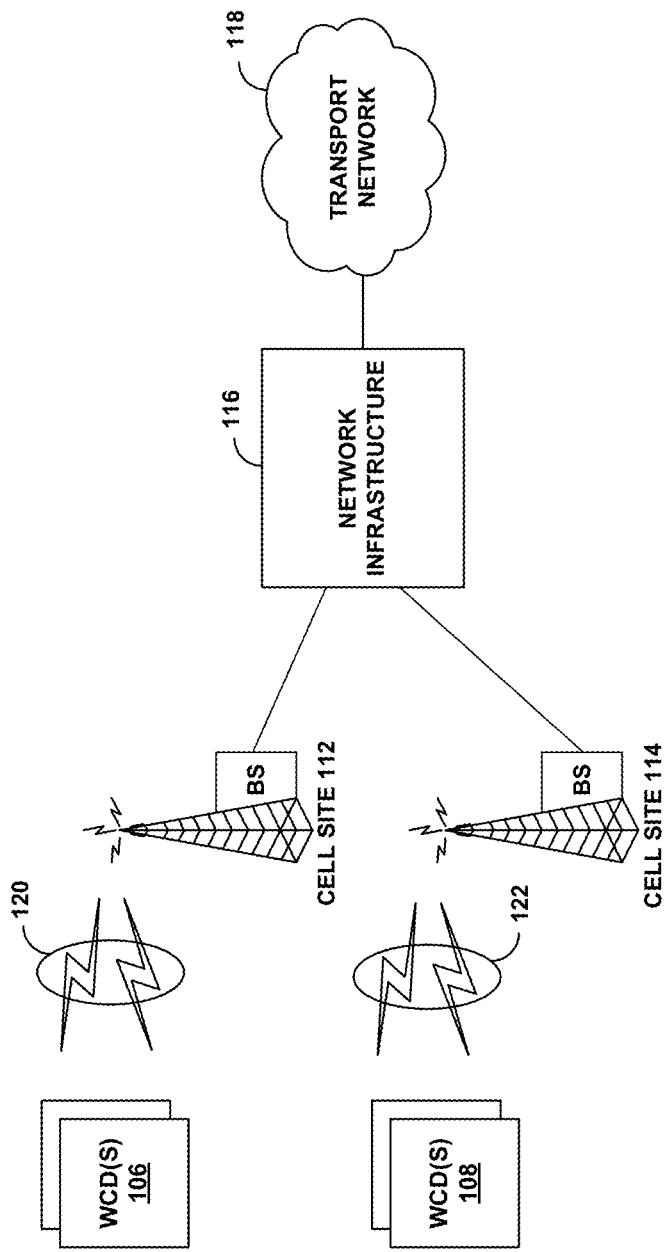
FIG. 1 is a simplified block diagram of an example wireless communication system including two representative cell sites.

Referring to the drawings, as noted above, FIG. 1 is a simplified block of an example wireless communication system including two representative cell sites 112, 114. In this example arrangement, the two cell sites 112, 114 are shown as being base station antenna towers with respective supporting cell site equipment shown as a box labeled "BS." In practice, though, a cell site does not need to have an antenna tower but could take some other form. For instance, the antenna configuration of a cell site could be mounted on a building or other structure, or the cell site could be provided in a smaller, integrated form as a small-cell, femtocell, or the like. Other examples are possible as well. Further, note that features of the present disclosure can apply with more than just two cell sites; for instance, an RRH can be shared in theory among three or more cell sites as well.

As further shown, both example cell sites 112, 114 are coupled with network infrastructure 116 (e.g., including routers, gateways, switches, servers, etc.), which may provide connectivity with a transport network 118, such as the Internet for instance. In addition, each cell site is configured to provide one or more respective wireless coverage areas, such as sectors on particular carriers, in which to serve UEs. In particular, cell site 112 is shown providing one or more wireless coverage areas 120 in which to serve UEs, and cell site 114 is shown providing one or more wireless coverage areas 122 in which to serve UEs.

In practice, these cell sites may be arranged to provide wireless communication service in accordance with a defined air interface protocol, examples of which include, without limitation, Orthogonal Frequency Division Multiple Access (OFDMA) (e.g., Long Term Evolution (LTE), or Wireless Interoperability for Microwave Access (WiMAX)), Code Division Multiple Access (CDMA), Global System for Mobile Communication (GSM), or various wireless local area network protocols, such as IEEE 802.11 (WiFi), BLUETOOTH, or the like. The UEs operating in coverage of such a cell site may then be configured to communicate according to the same air interface protocol.

As shown, the two example cell sites 112, 114 are separately located. That is, the cell sites are at different physical locations than each other. At a minimum, this may mean that the antenna configuration of each cell site is at a different physical location that the antenna configuration of the other cell site, even if a wireless coverage areas of one cell site may overlap in part with a wireless coverage area of the other cell site. By way of example, this arrangement could be provided on a campus or stadium, with cell sites established at various key locations throughout the campus or stadium in an effort to provide seamless wireless coverage. Considering a sports stadium for instance, cell sites could be set up at key locations in the perimeter of the stadium and in a parking area of the stadium.

Figure 2:
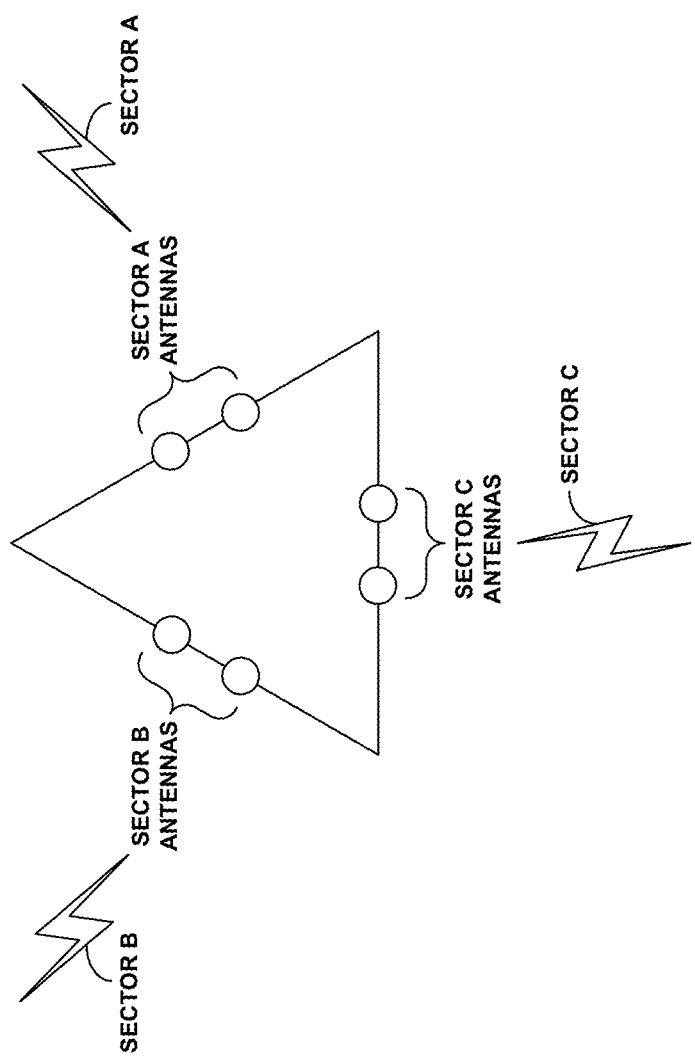
FIG. 2 is a simplified top view depiction of a representative cell site antenna configuration, in accordance with example embodiments.

FIG. 2 is next a simplified top view depiction of a representative cell site antenna configuration, for an example three-sector cell site where each sector comprises two antennas to facilitate 2T2R operation for instance. As shown in FIG. 2, the cell site antenna configuration is arranged to provide three sectors, A, B, and C. To facilitate this, the antenna configuration includes separately for each sector two respective antennas, such as dipole antennas for instance. Thus, as shown, the antenna configuration includes (i) two sector A antennas configured to provide an RF radiation pattern defining sector A, (ii) two sector B antennas configured to provide an RF radiation pattern defining sector B, (iii) two sector B antennas configured to provide an RF radiation pattern. In an alternative configuration, a different number of antennas could be provided per sector, or the antennas could be configured in another way.

As a general matter, the antennas of a given cell site such as this can be considered cell site antennas, or site antennas. Thus, antennas of cell site 112 could be considered site-12 antennas, and antennas of cell site 114 could be considered site-14 antennas.

Figure 3:
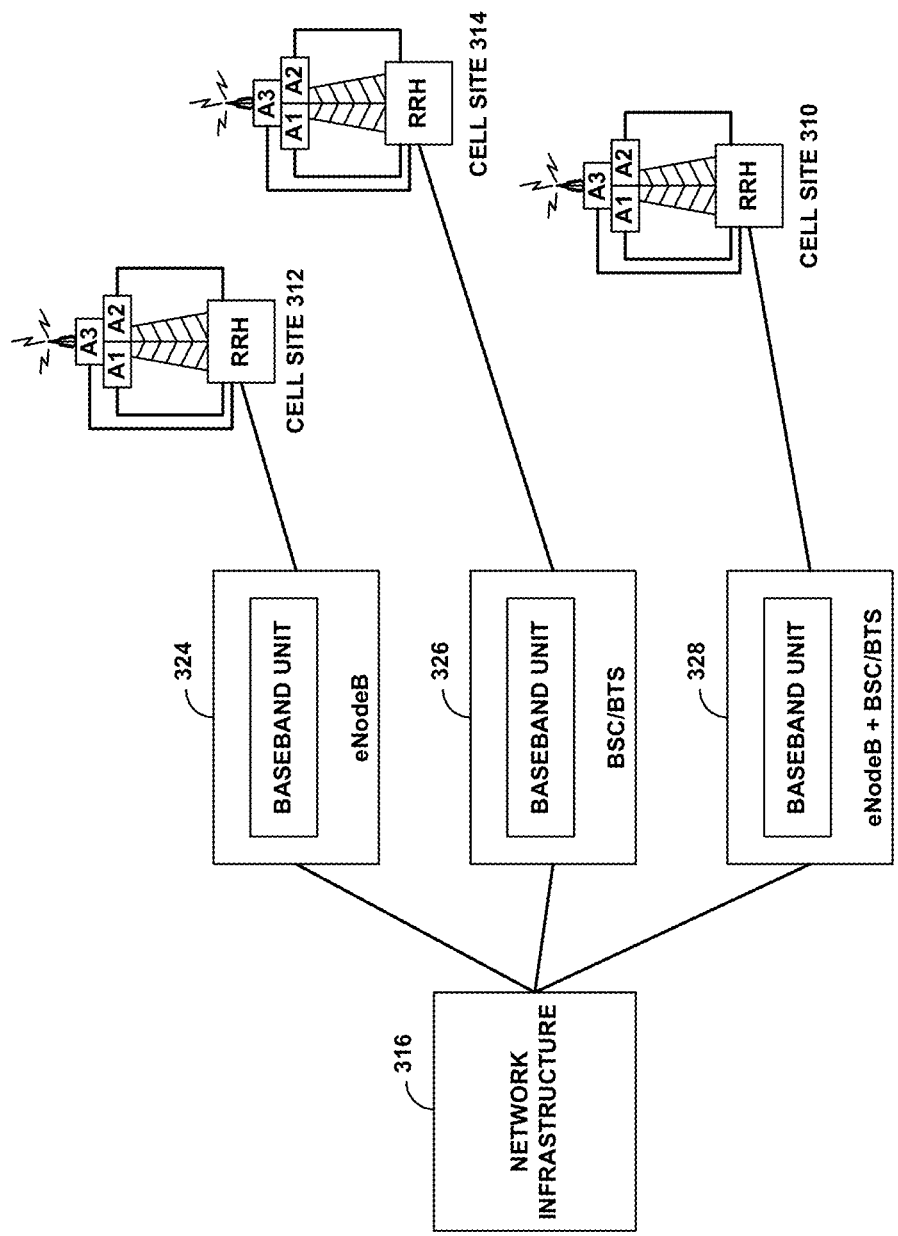
FIG. 3 is a simplified block diagram of an example wireless communication system depicting example deployments of base stations including base band units and remote radio heads, in accordance with example embodiments.

FIG. 3 is a simplified block diagram of an example wireless communication system depicting example deployments of base stations including base band units and remote radio heads, in accordance with example embodiments. As shown, network infrastructure 316 connects to three base stations 324, 326, and 325. By way of example the base station 324 is an eNodeB configured for operation according to LTE. Also by way of example, the base station 326 includes a base station controller (BSC) and a base transceiver station (BTS) configured for operation according to CDMA, while the base station 328 includes functionality of both an eNodeB and BSC/BTS.

Each base station includes a baseband unit (BBU) configured to encode/decode data on a per coverage area basis. Each BBU can be configured according to the specific air interface technology (or technologies) supported. Thus, the BBU of the eNodeB 324 may encode and decode data according to LTE protocols and standards, for example. Similarly, the BBU of the BSC/BTS 326 may encode and decode data according to one or more CDMA protocols and standards, while the BBU for the combined eNodeB and BSC/BTS 328 may include functionality for both LTE and CDMA. Other interface technologies may be supported as well within a BBU. Although not necessarily shown, each base station may also include or be coupled with one or more control/management entities for operating the base station according to the respective air interface technology (or technologies), so as to carry out control and signaling function appropriate to LTE, CDMA, and/or other protocols.

The BBU of each base station is then connected to a respective RRH of a cell site that provides one or more coverage areas of the base station. Thus, the BBU of the eNodeB 324 is connected to the RRH of the cell site 312, for example. Similarly, the BBU of the BSC/BTS 326 is connected to the RRH of the cell site 314, while the BBU for the combined eNodeB and BSC/BTS 328 is connected to the RRH of the cell site 310. Each RRH is, in turn, connected to one or more antennas or antenna systems of the respective cell site. By way of example, each of the cell sites 312, 314, and 310 is depicted as having three antenna systems, labeled "A1," "A2," and "A3." Typically, the RRH will have a separate RF connection to each antenna system, as illustrated in FIG. 3. It will be appreciated that the configuration of base stations and cell sites shown in FIG. 3 is illustrative, and that other configurations are possible as well.

Figure 4:
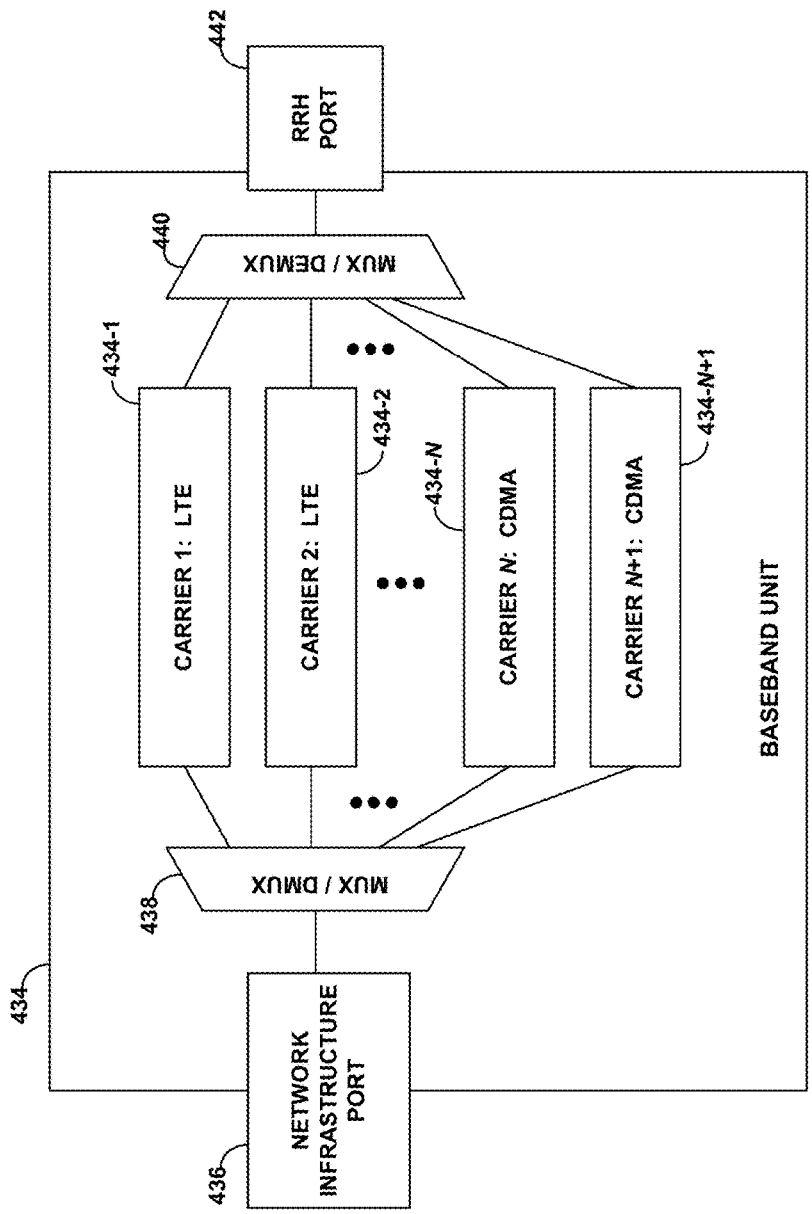
FIG. 4 is a simplified block diagram of an example baseband unit, in accordance with example embodiments.

FIG. 4 is next a simplified block diagram of an example baseband unit 434. As shown, the example baseband unit includes a network infrastructure port 436 for coupling with network infrastructure as noted above, and an RRH port 442 for coupling with an RRH. As shown, the baseband unit holds multiple channel cards 434-1, 434-2, . . . , 434-N, 434-N+1, each configured in the example arrangement to provide service for a cell site on a respective carrier and according to a respective air interface technology. A MUX/DEMUX unit 438 connects between the line cards and the network infrastructure port 436, serving to de-multiplex downlink signals from the network for distribution to the appropriate line cards, and to multiplex decoded uplink signals from the line cards for transmission to the network. Similarly, a MUX/DEMUX unit 440 connects between the line cards and the RRH port 442, serving to multiplex encoded downlink signals from the appropriate line cards to the RRH (or RRHs), and to de-multiplex uplink signals from the RRH (or RRHs) to line cards. In practice, each channel card could have separate logic modules for carrying out baseband unit functions such encoding/decoding on a per sector basis.

Baseband unit 434 and its channel cards may have an associated base station identifier and network address, so that the network infrastructure 116 can route data to the baseband unit for transmission in the baseband unit's cell site. As data arrives at the baseband unit, demultiplexing RRH port 438 unit may distribute the data to an appropriate channel card, and the channel card may encode the data and output the encoded data for transmission in an appropriate cell and according to an appropriate air interface technology, and vice versa. In practice, the RRH port 438 of the baseband unit may be couple the baseband port 528 of the RRH by a cable encasing multiple fiber optic cables (e.g., common public radio interface (CPRI) cables), such as one per carrier per sector. For instance, a given sector from the first channel card (carrier 1) could be coupled by a first fiber optic cable with a connection at the RRH, so that the RRH can handle such communications on carrier 1 for the given sector, and similarly for other carriers and sectors.

Figure 5:
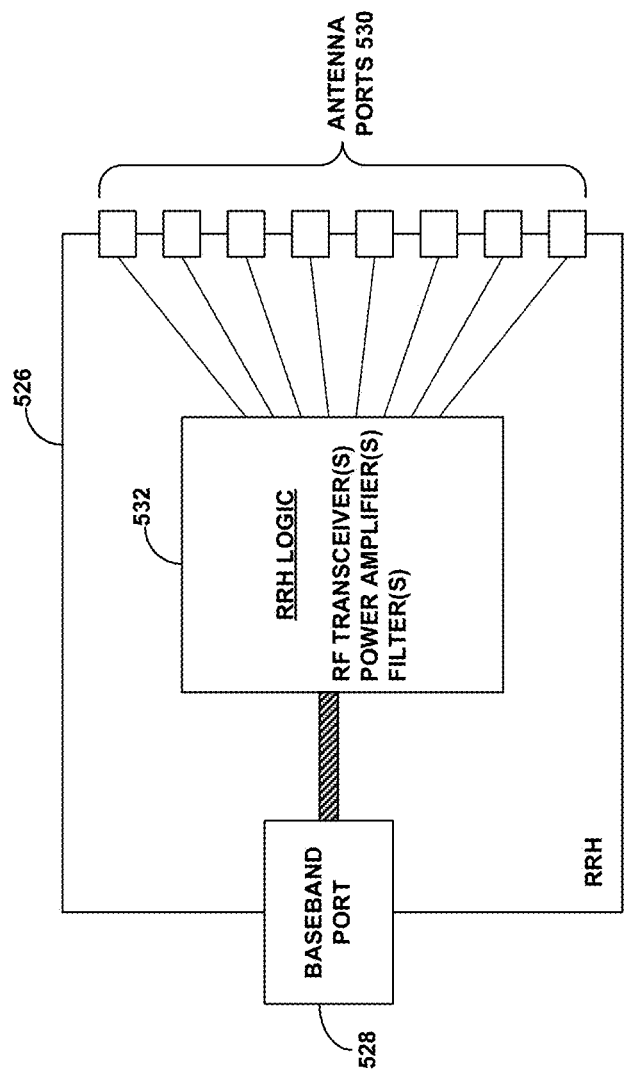
FIG. 5 is a simplified block diagram of an example RRH, in accordance with example embodiments.

FIG. 5 is next a simplified block diagram of an example RRH 526. As shown, the example RRH includes at least one baseband port 528 for coupling with at least one baseband unit as noted above, and a plurality of antenna ports 530 for coupling with cell site antennas as noted above. In an example arrangement, without limitation, the baseband port could be a multi-fiber-cable port for connecting with a multi-fiber cable that connects in turn with the baseband unit. Each fiber could carry a different channel according its connection (e.g., by way of the MUX/DEMUX) 440) to a particular channel card of the BBU. Further, by way of example, the RRH is shown including eight antenna ports for coupling with cell site antennas or antenna systems, although an example RRH could just as well have a different number of antenna ports. Each antenna port could be configured to carry one or more channels. An example RRH such as this may be housed in a unitary housing, which could be configured for mounting on an antenna tower or elsewhere at a cell site.

As additionally shown, the example RRH includes RRH logic 532 comprising one or more components such as RF transceivers, power amplifiers, and filters, cooperatively functioning to carry out various RRH functions for interfacing between a baseband unit and one or more cell site antennas. In a representative arrangement, for instance, for downlink operation, the RRH logic may include an RF transceiver block that receives symbols from a baseband unit channel card and applies an oscillator to modulate a corresponding carrier for the applicable sector. In turn, the RRH logic may then include one or more power amplifiers to amplify the modulated carrier, and one or more filters to help restrict transmission to the desired carrier bandwidth. And the output of the RRH filters may then pass to one or more appropriate antenna ports for output by appropriate cell site antennas. In practice, the RF transceiver and/or other components of the RRH could include a field programmable gate array (FPGA) that can be programmed to provide a desired RRH configuration such as one of those noted above.

As noted above, the BBU and RRH of a cell site need not necessarily be co-located. For example, a BBU and base station controlling functions (e.g., eNodeB, BSC, etc.) may be centrally located, while one or more RRHs may be located at remote cell sites. In addition, the separation of BBU and RRH functions and operations facilitates expansion and reconfiguration of cell sites to meet changing demand and needs. For example, a cell site may be expanded to include additional coverage areas according to added RF carriers and/or air interface technologies by adding channel cards to one or more BBUs. Additional antenna systems may be added as well if there are no available ports on existing ones.

While the distributed architecture of the BBU-RRH deployment can help the capacity and services of a cell site keep pace with evolving demand, it can also introduce problems when capabilities and/or design characteristics of incrementally introduced equipment are mismatched. More specifically, there can be a mismatch between the number of ports on an RRH and the number of ports on an antenna or antenna system to which the RRH connects. Adapting a deployment to account for such a mismatch can involve combining signals from two or more ports on the component (RRH or antenna) having the larger number ports so as to reduce the number of connections made on the component having the fewer number of ports, thereby matching the reduced number of connections to the fewer number of ports. Although this approach can address the mismatch in the number of ports on the respective components, hardware elements—e.g., combiners—that combine two or more input signals into a single output signal can produced insertion loss in the communication path between ports of the respective components. Depending on the number of RRHs, the number of antenna systems, and the respective numbers of ports than need to be connected between them, insertion loss between the RRHs and the antenna systems can vary on a per-connection basis depending on how many (if any) combiners are used on each RF path. As a result, different RF paths between RRHs and antennas may be subject to different amounts of attenuation. This, in turn, can become problematic for communication services that concurrently utilize two or more channels that traverse RF paths having disparate attenuation.

In a particular arrangement in which an RRH has more ports than an antenna (or antenna system) to which it connects, one or more combiners may be used on each of one or more RF paths, as described above. For downlink transmissions, the antenna transmission power of channels that traverse such an RF path having one more combiners may therefore be subject to more attenuation than the antenna transmission power of channels that traverse an RF path with no (or fewer) combiners. If two downlink channels traversing different RF paths to antennas are subject to different attenuation, and at the same time are configured for concurrently serving a given UE with a service that combines and/or coordinates downlink transmissions, the unequal attenuation may degrade or disrupt proper delivery of the service. In accordance with example embodiments, a serving base station of the UE may be detect when such unequal attenuation exceeds a difference threshold, and may responsively take actions to attempt to boost the transmission power of the channel suffering greater attenuation. Doing so can help ensure that the concurrent-channel service is delivered properly, or at least within a tolerable or acceptable amount of degradation.

Figure 6:
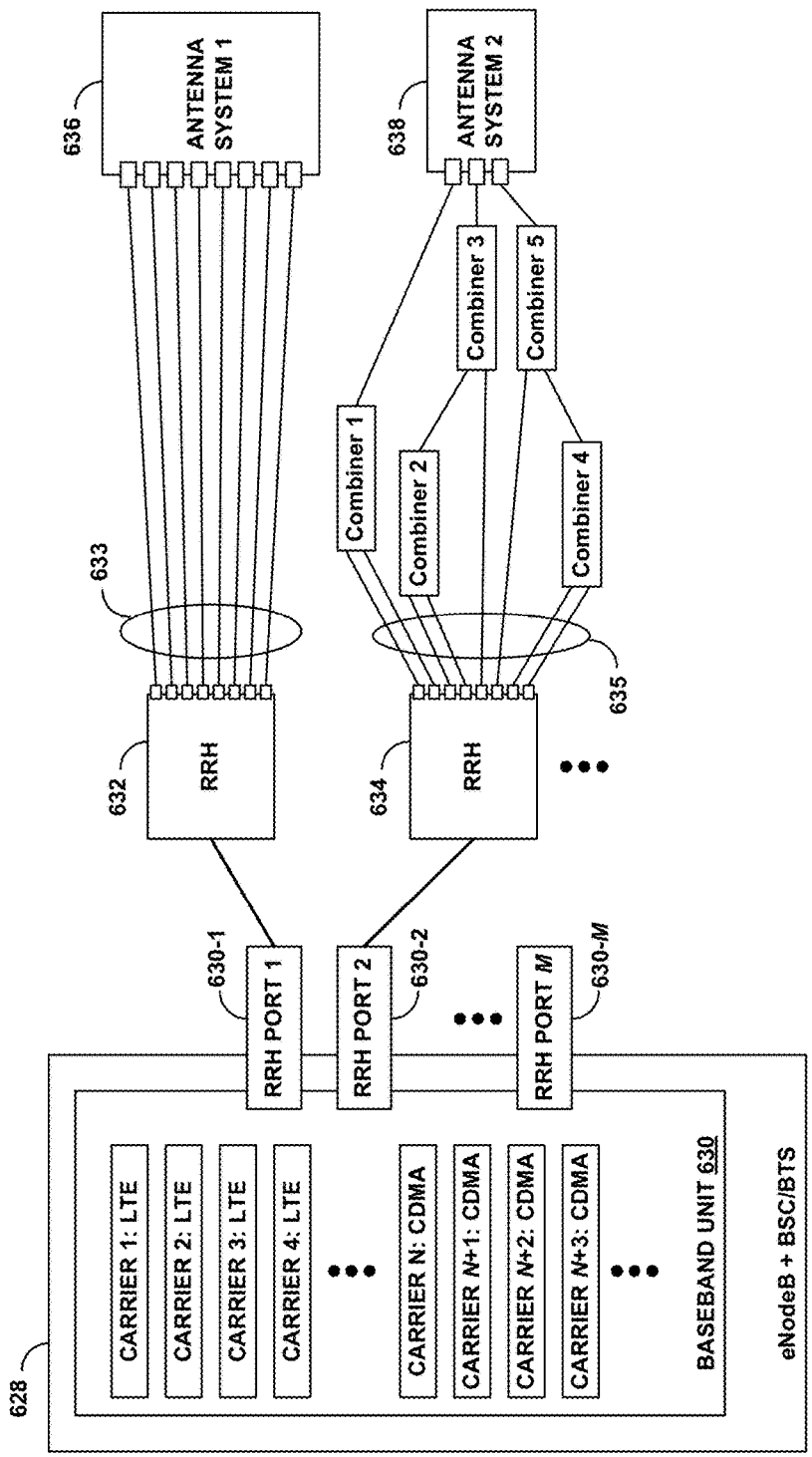
FIG. 6 is a simplified block diagram of an example baseband unit, example remote radio heads, example antenna systems, and representative communicative connections between them, in accordance with example embodiments.

FIG. 6 is a simplified block diagram of an example arrangement of a baseband unit, example remote radio heads, and example antenna systems, illustrating example RF connections with and without combiners, in accordance with example embodiments. As shown, FIG. 6 depicts a base station 628 that, by way of example, incorporates functionality of both an eNodeB and BSC/BTS. In the example base station 628, this combined functionality is implement by a BBU 630 that includes channel cards respective configured or designed for LTE or CDMA. Specifically, respective channel cards for RF carriers 1 through 4 are each configured for LTE, while respective channel cards for RF carriers N through N+3 are each configured for CDMA. Vertical ellipses represent other channel cards configured for other possible RF carriers and air interface technologies.

Also by way of example, the BBU 630 has multiple RRH ports 628-1, 628-2, . . . , 628-M (labeled "RRH Port 1," "RRH Port 2," . . . , "RRH Port M") for connecting to one or more RRHs. In the illustration, RRH Port 628-1 connects to an RRH 632 and RRH Port 628-2 connects to RRH 634. For the sake of brevity in the figure, a connection between the RRH Port 628-M and an RRH is omitted. Each RRH, in turn, is connected to a respective antenna system by way of a respective plurality of connections, such as coaxial cables, each providing an RF path. However, as shown by way of example in FIG. 6, the number of ports on an antenna system may not necessarily be the same as the number of ports on an RRH.

More particularly, for the arrangement shown in FIG. 6, the RRH 632 has eight ports and connects with the antenna system 636 (labeled "Antenna System 1"), which, by the way of example, also has eight ports. In this instance, the connections between the RRH 632 and the antenna system 636 are one-to-one, with eight direct connections 633, each providing a direct RF path. In contrast, and also by way of example, the RRH 634, which also has eight ports, connects with the antenna system 638 (labeled "Antenna System 8"), which has only three ports. Thus the eight connections 635 originating (or terminating) on the eight ports of the RRH 634 are combined into just three connections to match the number of ports on the antenna system 638. By way of example, five combiners, labeled "Combiner 1," "Combiner 2," "Combiner 3," "Combiner 4," and "Combiner 5," are used to accomplish the combined connections.

Specifically, progressing from top to bottom through the ports of the RRH 634, the first (from the top) two of the connections 635 are combined by Combiner 1, and the combined output is connected to the first (from the top) port on the antenna system 638. The next two connections from the RRH 634 are combined by Combiner 2, and the combined output is connected to one of two inputs of Combiner 3. The fourth connection from the RRH 634 is then input to the second of the two inputs of Combiner 3, and the combined output is connected to the second port on the antenna system 638. Finally, the last three connections from the RRH 634 are combined in a similar manner with two combiners. The last two connections from the RRH 634 are combined by Combiner 4, and the combined output is connected to one of two inputs of Combiner 5. The third-to-last connection from the RRH 634 is then input to the second of the two inputs of Combiner 5, and the combined output is connected to the second port on the antenna system 638.

With this configuration, every connection between the RRH 634 and the antenna system 638 includes one or two combiners. Correspondingly, every RF path from the RRH 634 to the antenna system 638 traverses either one combiner or two, cascaded combiners. As a consequence, every RF path from the RRH 634 to the antenna system 638 is subject to attenuation due to insertion loss that is absent (or largely so by comparison) from every RF path from the RRH 632 to the antenna system 636. It will be appreciated that the particular arrangement of relative number of ports on the RRH and antenna system, the number of combiners, and the specific combinations are illustrative, and that other arrangements are possible as well.

Figure 7A:
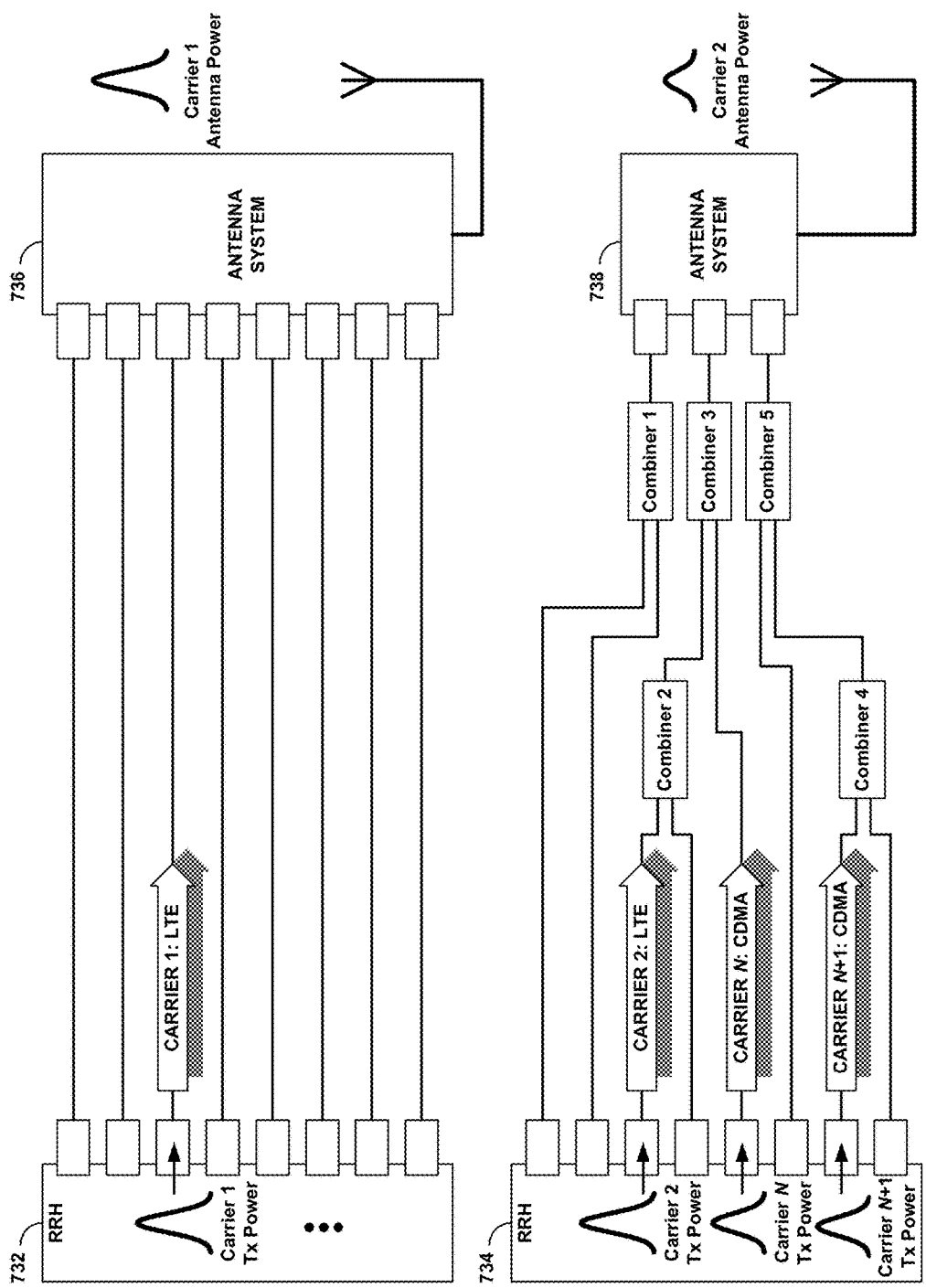
FIG. 7A is a simplified block diagram of example communicative connections between example baseband units and example antenna systems, and illustrating one aspect of operation, in accordance with example embodiments.
Figure 7B:
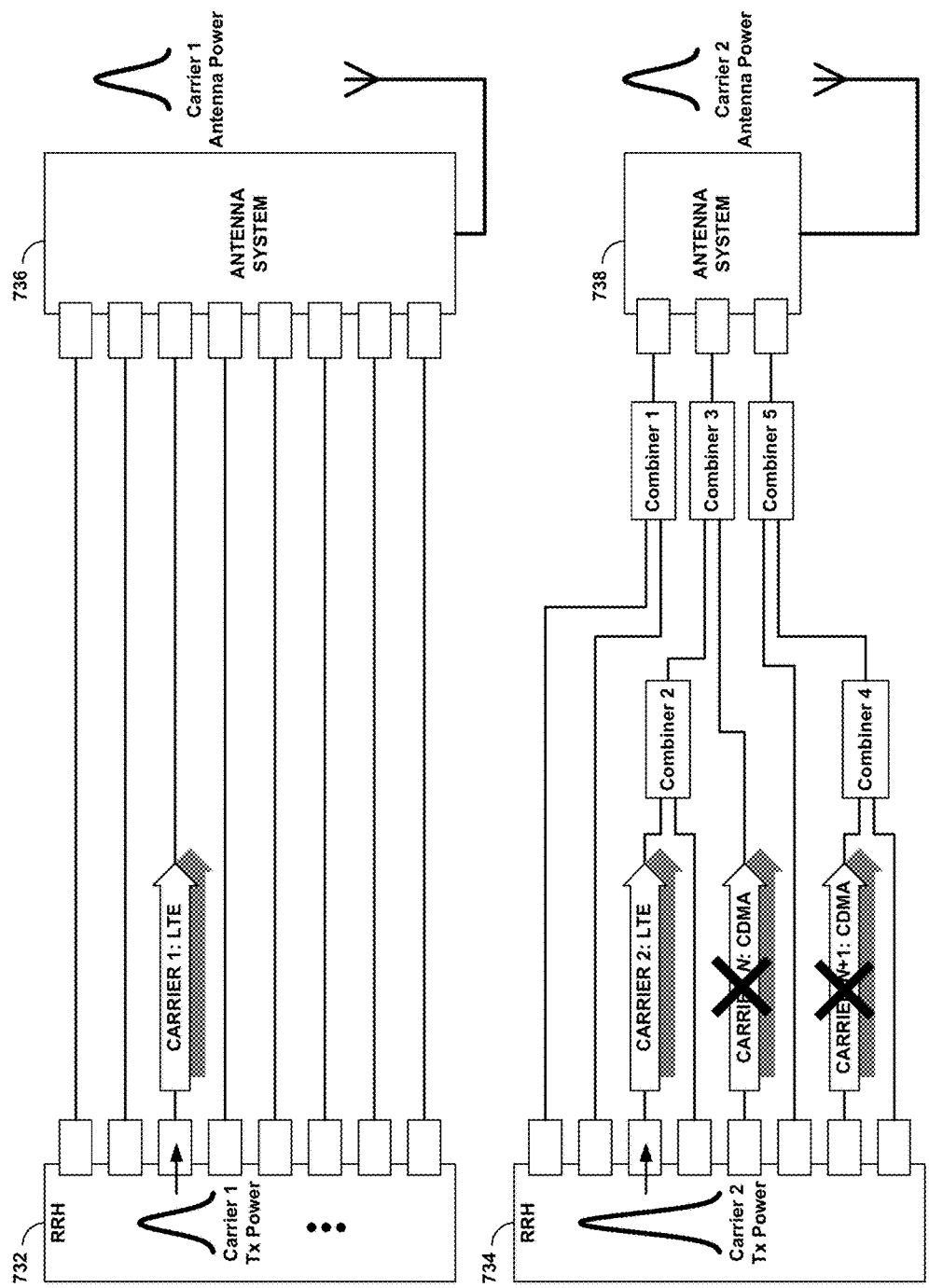
FIG. 7B is a simplified block diagram of example communicative connections between example baseband units and example antenna systems, and illustrating another aspect of operation, in accordance with example embodiments.

FIGS. 7A and 7B next show conceptual illustrations of disparate attenuation on RF paths from RRHs to antenna system, and how it may be compensated for in accordance with example embodiments of techniques disclosed herein. By way of example, both FIGS. 7A and 7B depict an RRH 732 having eight direct RF connections (e.g., via coaxial cables) to an antenna system 736. Both figures also show an RRH 734 having eight ports connected to an antenna system 738 having three ports, using five combiners, Combiner 1, Combiner 2, Combiner 3, Combiner 4, and Combiner 5, to accommodate the mismatched number of ports. By way of example, the configuration of combiners is the same as that illustrated between the RRH 634 and the antenna system 638 shown in FIGS. 6.

In FIGS. 7A and 7B, an RF channel labeled "Carrier 1" (e.g., centered at RF carrier 1) is depicted as being transmitted from the third port (from the top) of the RRH 732 to the third port (from the top) of the antenna system 736 on a direct port-to-port connection. The signal of Carrier 1 transmitted from the RRH 732 is represented by a pulse, where the height of the pulse represents the transmission power (labeled "Tx Power") at the RRH. By way of example, Carrier 1 is taken to be an LTE channel. At the antenna system 736, Carrier 1 is transmitted with antenna power represented also by a pulse, where the height of the pulse represents the transmitted power. Because the connection is direct, the RF path traversed by Carrier 1 is not subject to attenuation due to insertion loss. Consequently, the antenna transmission power is largely unattenuated with respect to the Tx power at the RRH. This is represented by the similar heights of the pulses representing Carrier 1 at the RRH and at the antenna system.

In practice, the Carrier 1 will suffer some attenuation due to transmission characteristics of the connection. However, all direct connections between an RRH and an antenna system are subject to this type of characteristic attenuation. Further, although the characteristic attenuation of a direct connection may depend on the carrier frequency, the differences due to frequency dependence will typically be small compared with attenuation due to insertion loss caused by one or more combiners in the RF path. Thus, for the purposes of the present discussion, characteristic attenuation is neglected. Also, for the sake of brevity in FIGS. 7A and 7B, no other channels are shown on any of the connections between the RRH 732 and the antenna system 736. It will be appreciated that all or some of the other ports on the RRH 732 may be carrying active RF channels. In particular, the total amount of transmission power of all ports and channels on the RRH 732 may be at full capacity.

By way of example, and similarly illustrated, the RRH 734 in FIG. 7A is shown as transmitting an RF channel labeled "Carrier 2" (e.g., centered at RF carrier 2), an RF channel labeled "Carrier N" (e.g., centered at RF carrier N), and an RF channel labeled "Carrier N+1" (e.g., centered at RF carrier N+1). The Tx power at the RRH 734 of each of these channels is again represented by a pulse height. However, due to the combiners in the respective path of each of the RF channels, each will suffer added attenuation. This is depicted only for Carrier 2, where the pulse height representing the transmitted antenna power is much lower than that representing the Tx power at the RRH. For the sake of brevity in the FIG. 7A, antenna transmission power for each of Carrier N and Carrier N+1 is not shown. Also for the sake of brevity, no other channels are shown on any of the connections between the RRH 734 and the antenna system 738, although all or some of the other ports on the RRH 734 may be carrying active RF channels. As with the RRH 732, the total amount of transmission power of all ports and channels on the RRH 734 may be at full capacity, such that no one of the ports can have its Tx power increase without at least one other port having a corresponding decrease in Tx power.

In an example configuration, both antenna systems 732 and 734 may be deployed at a common cell site, and provide a variety of forms of geographically-overlapping cellular wireless coverage. For example, Carriers 1 and 2 may provide overlapping LTE cells or sectors at their different respective RF carrier frequencies. Similarly, Carriers N and N+1 may provide overlapping CDMA cells or sectors at their different respective RF carrier frequencies. As such, all four carriers taken together may provide overlapping coverage according to their air interface technologies and their respective RF carrier frequencies. It will be appreciated that other configurations of overlapping coverage could be supported as well, including additional channels (e.g. ones not explicitly shown) and other air interface technologies. Further, the actual amount and topology of overlapping areas of coverage could vary depending carrier, transmission power, and/or air interface technology, among other factors.

As noted above, some downlink services and/or operations can involve two (or possibly more) carriers concurrently. One example of such a service in LTE is carrier aggregation, in which an eNodeB serving a UE on a "primary" carrier will initiate concurrent service to the UE on a "secondary" carrier. As each carrier may define a distinct cell or sector, the terms "P-cell" and "S-cell" are sometimes used to designate two carriers utilized in carrier aggregation. Carrier aggregation can also involve additions S-cells. For the purposes of the present discussion, it is sufficient to consider just one S-cell, and thus carrier aggregation with two carriers. The aggregation of a P-cell and one or more S-cells may provide for concurrent duplicate downlink transmissions with improved overall signal-to-noise, thereby enabling a higher data rate than that with just the P-cell. Alternatively, the aggregation may be used to derive a higher bandwidth, thereby supporting a higher volume of data transmission than that with just the P-cell.

In order for carrier aggregation to be possible, the UE must be able to detect both carriers. Typically, the UE will be able to detect the P-cell, since it is the carrier on which the eNodeB will be serving the UE when it initiates carrier aggregation. Considering the example configuration of FIG. 7A, if the S-cell for carrier aggregation is Carrier 2, then the attenuated antenna transmission power could be large enough to adversely impact a UE's ability to detect the S-cell. This could be particularly the case near the edge of the cell, where detectability normally diminishes. Carrier aggregation is thus one example of a service that could suffer degradation or even failure if one of the carriers is subject to excessive attenuation, such as may occur on an RF path between an RRH and antenna system in which one or more combiners is used.

Another example of an operation that can concurrently involve two carriers is handover between carriers of a cell site. More particularly, two carriers of a cell site may define partially overlapping coverage areas, as described above. A simple example of overlapping circular cells having as a common center a cell tower transmitting on two (or more) LTE carriers serves as an illustration. Again considering the example configuration of FIG. 7A, if one carrier is Carrier 1 and the other is Carrier 2, then two cells might be concentric circles, but with the Carrier 2 cell having a smaller radius owing to attenuation of its antenna transmission power. In this case, a UE being served on Carrier 2 and positioned near the outer edge of the Carrier 2 cell (e.g., near the radius) might handover to the still strong signal of Carrier 1. Since this comparative cell topology will apply to all UEs being served on Carrier 2, the cell site might be subject to an excessive rate of handovers from the Carrier 2 cell to the Carrier 1 cell, leading to a load imbalance between the two cells.

It will be appreciated that there could be other examples of cellular wireless services on two or more carriers of a cell site for which unequal attenuation can be a source of service degradation.

In accordance with example embodiments, a network entity, such as an eNodeB or BSC can monitor one or another metric of antenna transmission power to identify circumstances in which excessive attenuation of one or more carriers included in a concurrent multi-carrier service of a cell site might cause degradation of the service. In response to making such an identification, the network entity could then take remedial action to compensate for the excessive attenuation and thereby avoid or alleviate potential or actual service degradation.

More specifically, upon determining that antenna transmission power of a given carrier of an RRH is attenuated by more than a threshold amount, and further that the RRH is already transmitting at maximum power capacity, the network entity can identify one or more RF channels of the RRH for which capacity loading is below a utilization threshold and take one or more of the identified RF channels out of service. The network entity may then reallocate or redistribute some or all of the transmission power of the removed RF channels to the given carrier in order to at least partially compensate for the excessive attenuation of the given RF carrier. The metric of antenna transmission power or of attenuation of a given carrier can be one or more reports from UEs of downlink power in the given channel. Reports could be monitored and compared against a threshold power level. Additionally or alternatively, determining excessive handover rates from the given RF carrier to a different RF carrier of the same cell site could also be an indication that the given RF carrier is suffering excessive attenuation.

In practice, one eNodeB might control or manage some or all of the LTE channels of a cell site, including those configured on different RRHs of the cell site. Similarly, on BSC or BTS might control or manage some or all of the CDMA channels of a cell site, including those configure on different RRHs of the cell site. Returning momentarily to FIG. 6, a possible configuration of this type is the combined eNodeB+BSC/BTS 628 that includes the BBU 630, which in turn hosts the RF channel cards that connect to the RRHs 634 and 634. The LTE channel cards could be under the control of the LTE, while the CDMA channel cards could be under the control of the BSC/BTS.

Coming back now to the example of FIGS. 7A and 7B, Carriers 1 and 2 (and other LTE channels) might be under the control of a single eNodeB. As such, the eNodeB might implement or activate carrier aggregation with Carriers 1 and 2 for one or more UEs from time to time, with Carrier 1 being the P-cell and Carrier 2 being an S-cell. Additionally or alternatively, the eNodeB might by controlling distinct but largely overlapping cells (or other forms of coverage areas) on Carriers 1 and 2, managing handovers between them as circumstances call for. Similarly, Carriers N and N+1 (and other CDMA channels) might be under the control of a single BSC/BTS.

In an example embodiment, the eNodeB might monitor antenna transmission power or attenuation of Carriers 1 and 2, and determine that the antenna transmission power of Carrier 2 is below a threshold. As noted, the eNodeB could continually monitor downlink power levels reported by UEs, or could receive a report of below-threshold power from a UE unable to detect an S-cell carrier. The eNodeB might then identify one or more RF channels of the RRH 734 that can spare transmission power. Next, the eNodeB could take action to reallocate some or all of the transmission power to the Carrier 2. The reallocated power could come from another LTE channel and/or a CDMA channel. In the case of reallocation from an LTE channel, the eNodeB could identify underutilized LTE channels, take them out of service, and reallocate the freed up power to Carrier 2. In the case of reallocation from a CDMA channel, the eNodeB could communicate with the BSC/BTS that is controlling the CDMA channels in order, first, to determine which CDMA channels might be underutilized, and, second, to direct the BSC/BTS to take those underutilized channels out of service so that some or all of the transmission power freed up by doing so can be reallocated by the eNodeB to Carrier 2.

FIG. 7B next conceptually illustrates remediation in accordance with example embodiments. An eNodeB could determine or detect excessive attenuation of antenna power of Carrier 2 (such as depicted on the right of the antenna system 738 in FIG. 7A). The eNodeB could then communicate with a BSC/BTS that is controlling Carriers N and N+1 (and other CDMA channels), and determine that both channels are sufficiently underutilized that they can be safely and/or reasonably removed from service. For example, both might be serving fewer than a threshold number of UEs, or each might be serving less than a specified fraction of the maximum capacity of the channel. By way of example, the channel capacity could be measured in number of UEs being served, and the threshold fraction could be 0.2 (20%). Other threshold fractions could be used as well. The eNodeB could then direct the BSC/BTS to remove Carriers N and N+1 from service. This is indicated in FIG. 7B by an "X" across each of Carriers N and N+1. The freed up power is then reallocated to the Tx power of Carrier 2, as indicated in the RRH 734. The boost in power then translates into higher antenna transmission power of Carrier 2, as indicated on the right side of the antenna system 738 in FIG. 7B. While the reallocation of transmission power can help remedy the excessive attenuation of Carrier 2 (in this example), it does not necessarily remove or reduce the attenuation. Rather, it compensates for the excessive attenuation by boosting power ahead of the attenuating elements (e.g., combiners). As a result, the transmitted signal of Carrier 2 may at a level sufficient to support services that involve it, such as carrier aggregation or more balanced handovers, for example.

The amount of transmission power made available of an excessively attenuated carrier by removing another carrier from service generally depends on the bandwidth and air interface technology of the removed carrier. For example, a 1.25 MHz CDMA channel typically consumes 20 Watts, while a 5 MHz LTE channel typically consumes 20 or 40 Watts. Thus, these are examples of the amounts of transmission power that could be made available for reallocation, in accordance with example embodiments. It will be appreciated that the techniques described above for reallocation do not necessarily depend on the amount of power made available by removing one or more underutilized channels from service.

While the discussion above describes the connection between an RRH and an antenna system as providing an RF path for just one carrier or RF channel, this need not necessarily be the case. For example, a given connection, whether it is a direct port-to-port connection or via one or more combiners, may provide an RF path for more than one RF carrier. As such, excessive attenuation on a given connection might impact more than one RF carrier. Further, reallocation of transmission power in order to compensate for excessive attenuation of a given RF carrier could boost the antenna transmission power of all RF carriers that share all or part of a common RF path from an RRH to an antenna system.

Figure 8:
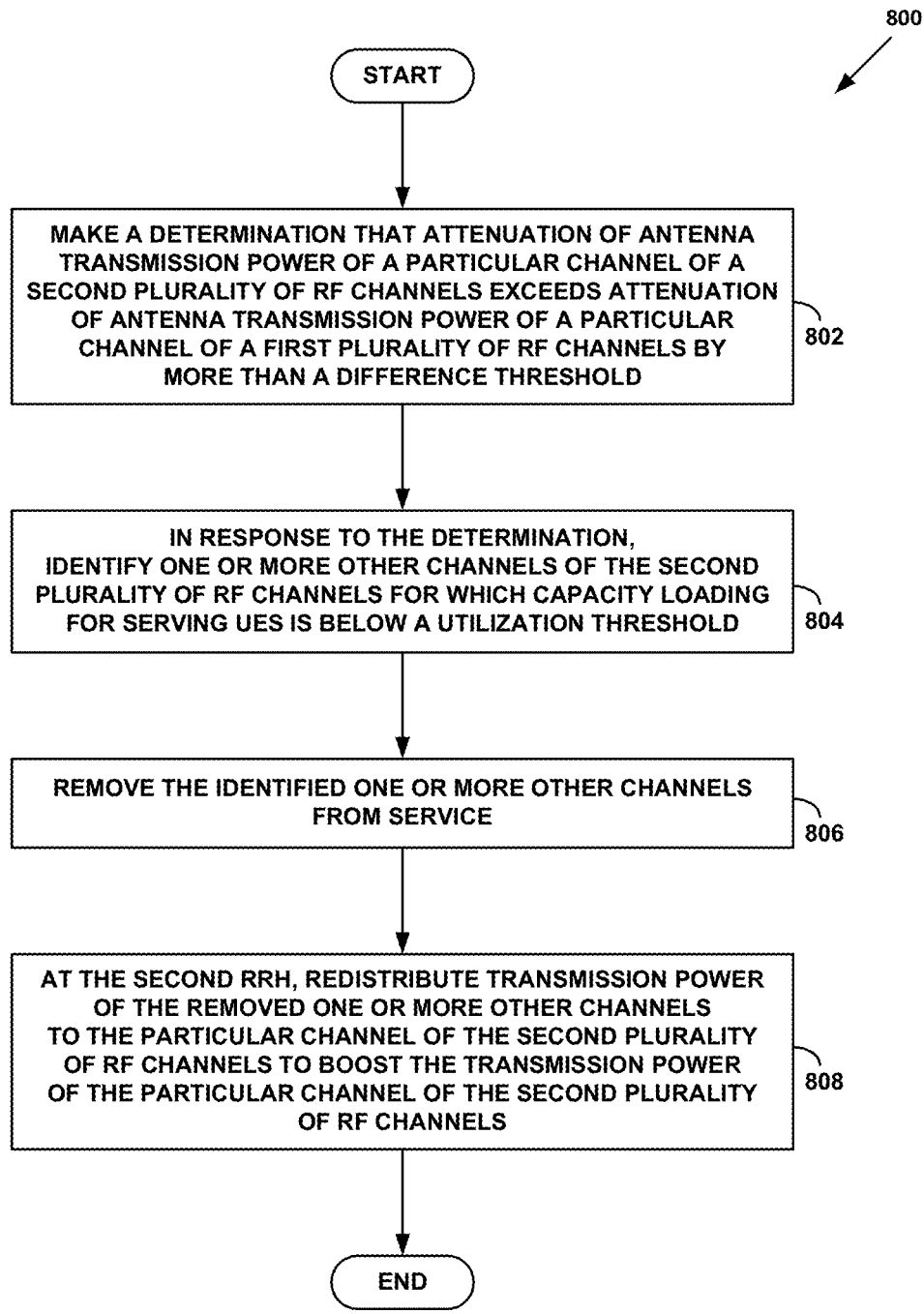
FIG. 8 is a flow chart depicting operations that can be implemented, in accordance with example embodiments.

FIG. 8 is a flowchart illustrating an example method 800, according to example embodiments. The example method 800 may be carried out in whole or in part a wireless communication network by one or more base stations and/or other components, such as by an eNodeB, BSC, BSC/BTS, or some combination thereof, as illustrated in FIGS. 1, 3, and/or 6, for example. These base stations are examples of a network device or component that could be configured to carry out the example method 800. However, it should be understood that the example method, such as method 800, may be carried out by other entities or combinations of entities as well as in other arrangements, without departing from the scope of the invention. By way of example, the method 800 could be implemented as machine language instructions that can be stored on non-transient machine-readable media (e.g, solid state memory, magnetic disk, etc), and that when executed by one or more processors of a base station to cause the base station to carry out operations, steps, and/or functions of the method.

In accordance with example embodiments, the method 800 could be carried in a cell site of a wireless communication system. The cell site could include (i) a first remote radio head (RRH) connected by a RF path to a first antenna system and (ii) a second RRH connected by a second RF path to a second antenna system. In such a configuration, the first RF path could support a first plurality of RF channels for air-interface communications with one or more UEs via the first antenna system, and the second RF path could support a second plurality of RF channels for air-interface communications with one or more UEs via the second antenna system. In this description, the each RF path could correspond to multiple connections between the first RRH and the first antenna system, and multiple connections between the second RRH and the second antenna system.

As shown in FIG. 8, at block 802, the method entails making a determination that attenuation of antenna transmission power of a particular channel of the second plurality of RF channels exceeds attenuation of antenna transmission power of a particular channel of the first plurality of RF channels by more than a difference threshold.

As shown in FIG. 8, at block 804, the method next entails responding to the determination by identifying one or more other channels of the second plurality of RF channels for which capacity loading for serving UEs is below a utilization threshold.

As shown in FIG. 8, at block 806, the method next entails removing the identified one or more other channels from service hold.

Finally, as shown in FIG. 8, at block 804, the method entails at the second RRH, redistributing transmission power of the removed one or more other channels to the particular channel of the second plurality of RF channels to boost the transmission power of the particular channel of the second plurality of RF channels.

In accordance with example embodiments, the particular channel of the first plurality of RF channels could be a first RF carrier and the particular channel of the second plurality of RF channels could be a different, second RF carrier. Further, the two RF carriers could be respective primary and secondary carrier components of downlink carrier aggregation for a given UE. In this instance, making the determination could entail receiving a reporting message from the given UE indicating that it is detecting the downlink power of the second RF carrier below a detection threshold.

In another example, the first and second RF carriers could be part of a common RF carrier band, and making the determination could entail determining that a rate of handovers of UEs from the second RF carrier to the first RF carrier exceeds a rate threshold.

In accordance with example embodiments, the cell site could include a base station server connected to, and controlling both, the first and second RRHs. In this configuration, identifying the one or more other channels of the second plurality of RF channels for which capacity loading for serving UEs is below the utilization threshold could entail the base station server monitoring capacity loading of at least a subset of the second plurality of RF channels.

In further accordance with example embodiments, each of the first plurality of RF channels could be to a respective RF carrier of a first plurality of RF carriers, and similarly, each of the second plurality of RF channels could be to a respective RF carrier of a second plurality of RF carriers. In this configuration, removing the identified one or more other channels from service could entail the base station server directing the second RRH to disable those RF carriers of the second plurality of RF carriers that correspond to the identified one or more channels. Further, redistributing transmission power of the removed one or more other channels at the second RRH to the particular channel of the second plurality of RF channels could entail the base station server directing the second RRH to increase transmission power of the particular channel of the second plurality of RF channels by applying at least a portion of power previously allocated to the disabled RF carriers.

In accordance with example embodiments, the wireless communication system could be configured to operate according to at least LTE and CDMA. The cell site could then include an eNodeB and a base station controller (BSC). In this configuration, each of the first plurality of RF channels could be a respective RF carrier of a first plurality of RF carriers. Further, one or more of the first plurality of RF channels, including the particular RF channel of the first plurality of RF channels, could be configured for transmitting according to LTE. Additionally, each of the second plurality of RF channels could be a respective RF carrier of a second plurality of RF carriers, where the second plurality of RF carriers being different than the first plurality of RF carriers. With this arrangement, one or more of the second plurality of RF channels, including the particular RF channel of the second plurality of RF channels, could be configured for transmitting according to LTE, and one or more of the second plurality of RF channels could be configured for transmitting according to CDMA. Then, identifying the one or more other channels of the second plurality of RF channels for which capacity loading for serving UEs is below the utilization threshold could entail the eNodeB monitoring the capacity loading of one or more of the second plurality of RF channels.

In further accordance with example embodiments, the monitoring the capacity loading of one or more of the second plurality of RF channels by the eNodeB could entail the eNodeB determining the capacity loading of the one or more of the second plurality of RF channels configured for transmitting according to LTE. Further, removing the identified one or more other channels from service could entail the eNodeB directing the second RRH to disable those RF carriers of the second plurality of RF carriers that correspond to the identified one or more channels. In this example, redistributing transmission power of the removed one or more other channels at the second RRH to the particular channel of the second plurality of RF channels could entail the eNodeB directing the second RRH to increase transmission power of the particular channel of the second plurality of RF channels by applying at least a portion of power previously allocated to the disabled RF carriers.

In still further accordance with example embodiments, eNodeB monitoring the capacity loading of one or more of the second plurality of RF channels by the eNodeB could entail the eNodeB communicating with the BSC to determine the capacity loading of the one or more of the second plurality of RF channels configured for transmitting according to CDMA. Then, removing the identified one or more other channels from service could entail the eNodeB instructing the BSC to direct the second RRH to disable those RF carriers of the second plurality of RF carriers that correspond to the identified one or more channels. Again, redistributing transmission power of the removed one or more other channels at the second RRH to the particular channel of the second plurality of RF channels could entail the eNodeB directing the second RRH to increase transmission power of the particular channel of the second plurality of RF channels by applying at least a portion of power previously allocated to the disabled RF carriers.

Figure 9:
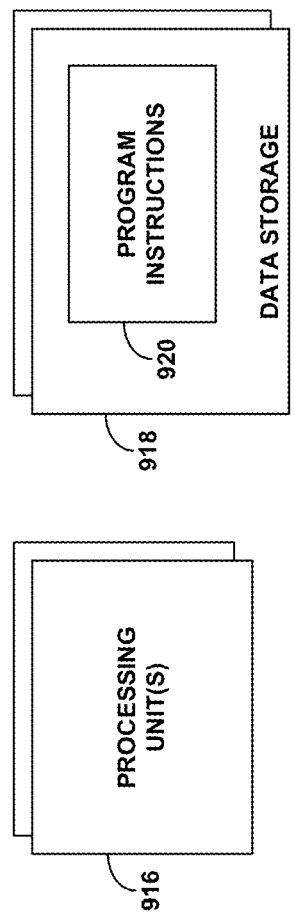
FIG. 9 is a block diagram depicting components of an example representative system, in accordance with example embodiments.

FIG. 9 is next a simplified block diagram of a system for compensating for excessive attenuation on an RF carrier between an RRH and antenna system of a cell site. As shown in FIG. 9, the example system includes at least one processing unit 916, at least one data storage 918, and program instructions 920 stored in the at least one data storage and executable by the at least one processing unit to carry out various operations a discussed above. These system components could be provided in conjunction with or as part of one or more of base stations and/or in another entity such an eNodeB, BSC, BSC/BTS, or some combination thereof, as illustrated in FIGS. 1, 3, and/or 6, for example.

The at least processing unit 916 may comprise one or more general purposes processors (e.g., microprocessors) and/or one or more specialized processors (e.g., application specific integrated circuits, etc.) The at least one data storage 918 may then comprise one or more volatile and/or non-volatile non-transitory storage components, such as magnetic, optical, or flash storage, and could be integrated in whole or in part with the at least one processing unit 916.

The program instructions 918 may then be executable to cause the system to carry out the example method 800 and/or other operations described above.

Exemplary embodiments have been described above. Those skilled in the art will understand, however, that changes and modifications may be made to these embodiments without departing from the true scope and spirit of the invention.

We claim:

1. In a cell site of a wireless communication system, the cell site including (i) a first remote radio head (RRH) connected by a first radio frequency (RF) path to a first antenna system and (ii) a second RRH connected by a second RF path to a second antenna system, wherein the first RF path supports a first plurality of RF channels for air-interface communications with one or more user equipment device (UEs) via the first antenna system, and the second RF path supports a second plurality of RF channels for air-interface communications with one or more UEs via the second antenna system, a method comprising:

making a determination that attenuation of antenna transmission power of a particular channel of the second plurality of RF channels exceeds attenuation of antenna transmission power of a particular channel of the first plurality of RF channels by more than a difference threshold;

in response to the determination, identifying one or more other channels of the second plurality of RF channels for which capacity loading for serving UEs is below a utilization threshold;

removing the identified one or more other channels from service; and at the second RRH, redistributing transmission power of the removed one or more other channels to the particular channel of the second plurality of RF channels to boost the transmission power of the particular channel of the second plurality of RF channels.

2. The method of claim 1, wherein the particular channel of the first plurality of RF channels corresponds to a first RF carrier and the particular channel of the second plurality of RF channels corresponds to a different, second RF carrier, wherein the first RF carrier and the second RF carrier are, respectively, primary and secondary carrier components of downlink carrier aggregation for a given UE, and wherein making the determination comprises receiving a reporting message from the given UE indicating that the given UE is detecting the downlink power of the second RF carrier below a detection threshold.

3. The method of claim 1, wherein the particular channel of the first plurality of RF channels corresponds to a first RF carrier and the particular channel of the second plurality of RF channels corresponds to a different, second RF carrier, the first and second RF carriers being part of a common RF carrier band, and wherein making the determination comprises determining that a rate of handovers of UEs from the second RF carrier to the first RF carrier exceeds a rate threshold.

4. The method of claim 1, wherein the cell site further comprises a base station server connected to, and controlling both, the first and second RRHs, and wherein identifying the one or more other channels of the second plurality of RF channels for which capacity loading for serving UEs is below the utilization threshold comprises the base station server monitoring capacity loading of at least a subset of the second plurality of RF channels.

5. The method of claim 4, wherein each of the first plurality of RF channels corresponds to a respective RF carrier of a first plurality of RF carriers, and each of the second plurality of RF channels corresponds to a respective RF carrier of a second plurality of RF carriers, wherein removing the identified one or more other channels from service comprises the base station server directing the second RRH to disable those RF carriers of the second plurality of RF carriers that correspond to the identified one or more channels; and wherein, at the second RRH, redistributing transmission power of the removed one or more other channels to the particular channel of the second plurality of RF channels comprises the base station server directing the second RRH to increase transmission power of a particular RF carrier of the second plurality RF carriers that corresponds to the particular channel of the second plurality of RF channels by applying at least a portion of power previously allocated to the disabled RF carriers.

6. The method of claim 1, wherein the wireless communication system is configured to operate according to at least Long Term Evolution (LTE) and Code Division Multiple Access (CDMA), and the cell site further comprises an eNodeB and a base station controller (BSC), wherein each of the first plurality of RF channels corresponds to a respective RF carrier of a first plurality of RF carriers, and one or more of the first plurality of RF channels, including the particular RF channel of the first plurality of RF channels, is configured for transmitting according to LTE, wherein each of the second plurality of RF channels corresponds to a respective RF carrier of a second plurality of RF carriers, the second plurality of RF carriers being different than the first plurality of RF carriers, one or more of the second plurality of RF channels, including the particular RF channel of the second plurality of RF channels, is configured for transmitting according to LTE, and one or more of the second plurality of RF channels is configured for transmitting according to CDMA; and wherein identifying the one or more other channels of the second plurality of RF channels for which capacity loading for serving UEs is below the utilization threshold comprises the eNodeB monitoring the capacity loading of one or more of the second plurality of RF channels.

7. The method of claim 6, wherein the eNodeB monitoring the capacity loading of one or more of the second plurality of RF channels comprises the eNodeB determining the capacity loading of the one or more of the second plurality of RF channels configured for transmitting according to LTE;

wherein removing the identified one or more other channels from service comprises the eNodeB directing the second RRH to disable those RF carriers of the second plurality of RF carriers that correspond to the identified one or more channels; and wherein, at the second RRH, redistributing transmission power of the removed one or more other channels to the particular channel of the second plurality of RF channels comprises the eNodeB directing the second RRH to increase transmission power of a particular RF carrier of the second plurality RF carriers that corresponds to the particular channel of the second plurality of RF channels by applying at least a portion of power previously allocated to the disabled RF carriers.

8. The method of claim 6, wherein the eNodeB monitoring the capacity loading of one or more of the second plurality of RF channels comprises the eNodeB communicating with the BSC to determine the capacity loading of the one or more of the second plurality of RF channels configured for transmitting according to CDMA;

wherein removing the identified one or more other channels from service comprises the eNodeB instructing the BSC to direct the second RRH to disable those RF carriers of the second plurality of RF carriers that correspond to the identified one or more channels; and wherein, at the second RRH, redistributing transmission power of the removed one or more other channels to the particular channel of the second plurality of RF channels comprises the eNodeB directing the second RRH to increase transmission power of a particular RF carrier of the second plurality RF carriers that corresponds to the particular channel of the second plurality of RF channels by applying at least a portion of power previously allocated to the disabled RF carriers.

9. A cell site of a wireless communication system, the cell site comprising:

a first antenna system;

a second antenna system;

a first remote radio head (RRH) connected by a first radio frequency (RF) path to the first antenna system, wherein the first RF path supports a first plurality of RF channels for air-interface communications with one or more user equipment device (UEs) via the first antenna system;

a second RRH connected by a second RF path to the second antenna system, wherein the second RF path supports a second plurality of RF channels for air-interface communications with one or more UEs via the second antenna system;

one or more processors, and memory storing instructions that, when executed by the one or more processors, cause the cell site to carry out operations including:

making a determination that attenuation of antenna transmission power of a particular channel of the second plurality of RF channels exceeds attenuation of antenna transmission power of a particular channel of the first plurality of RF channels by more than a difference threshold;

in response to the determination, identifying one or more other channels of the second plurality of RF channels for which capacity loading for serving UEs is below a utilization threshold;

removing the identified one or more other channels from service; and at the second RRH, redistributing transmission power of the removed one or more other channels to the particular channel of the second plurality of RF channels to boost the transmission power of the particular channel of the second plurality of RF channels.

10. The cell site of claim 9, wherein the particular channel of the first plurality of RF channels corresponds to a first RF carrier and the particular channel of the second plurality of RF channels corresponds to a different, second RF carrier, wherein the first RF carrier and the second RF carrier are, respectively, primary and secondary carrier components of downlink carrier aggregation for a given UE, and wherein making the determination comprises receiving a reporting message from the given UE indicating that the given UE is detecting the downlink power of the second RF carrier below a detection threshold.

11. The cell site of claim 9, wherein the particular channel of the first plurality of RF channels corresponds to a first RF carrier and the particular channel of the second plurality of RF channels corresponds to a different, second RF carrier, the first and second RF carriers being part of a common RF carrier band, and wherein making the determination comprises determining that a rate of handovers of UEs from the second RF carrier to the first RF carrier exceeds a rate threshold.

12. The cell site of claim 9, wherein the cell site further comprises a base station server connected to, and controlling both, the first and second RRHs, and wherein identifying the one or more other channels of the second plurality of RF channels for which capacity loading for serving UEs is below the utilization threshold comprises the base station server monitoring capacity loading of at least a subset of the second plurality of RF channels.

13. The cell site of claim 12, wherein each of the first plurality of RF channels corresponds to a respective RF carrier of a first plurality of RF carriers, and each of the second plurality of RF channels corresponds to a respective RF carrier of a second plurality of RF carriers, wherein removing the identified one or more other channels from service comprises the base station server directing the second RRH to disable those RF carriers of the second plurality of RF carriers that correspond to the identified one or more channels; and wherein, at the second RRH, redistributing transmission power of the removed one or more other channels to the particular channel of the second plurality of RF channels comprises the base station server directing the second RRH to increase transmission power of a particular RF carrier of the second plurality RF carriers that corresponds to the particular channel of the second plurality of RF channels by applying at least a portion of power previously allocated to the disabled RF carriers.

14. The cell site of claim 9, wherein the wireless communication system is configured to operate according to at least Long Term Evolution (LTE) and Code Division Multiple Access (CDMA), and the cell site further comprises an eNodeB and a base station controller (BSC), wherein each of the first plurality of RF channels corresponds to a respective RF carrier of a first plurality of RF carriers, and one or more of the first plurality of RF channels, including the particular RF channel of the first plurality of RF channels, is configured for transmitting according to LTE, wherein each of the second plurality of RF channels corresponds to a respective RF carrier of a second plurality of RF carriers, the second plurality of RF carriers being different than the first plurality of RF carriers, one or more of the second plurality of RF channels, including the particular RF channel of the second plurality of RF channels, is configured for transmitting according to LTE, and one or more of the second plurality of RF channels is configured for transmitting according to CDMA;

wherein identifying the one or more other channels of the second plurality of RF channels for which capacity loading for serving UEs is below the utilization threshold comprises the eNodeB monitoring the capacity loading of one or more of the second plurality of RF channels;

wherein the eNodeB monitoring the capacity loading of one or more of the second plurality of RF channels comprises the eNodeB determining at least one of: the capacity loading of the one or more of the second plurality of RF channels configured for transmitting according to LTE, or the capacity loading reported by the BSC of the one or more of the second plurality of RF channels configured for transmitting according to CDMA;

wherein removing the identified one or more other channels from service comprises the eNodeB instructing at least one of: the second RRH to disable those RF carriers of the second plurality of RF carriers that correspond to the identified one or more channels, or the BSC to direct the second RRH to disable those RF carriers of the second plurality of RF carriers that correspond to the identified one or more channels; and wherein, at the second RRH, redistributing transmission power of the removed one or more other channels to the particular channel of the second plurality of RF channels comprises the eNodeB directing the second RRH to increase transmission power of a particular RF carrier of the second plurality RF carriers that corresponds to the particular channel of the second plurality of RF channels by applying at least a portion of power previously allocated to the disabled RF carriers.

15. A base station of a wireless communication system, the base station comprising:
a first communication interface to a first remote radio head (RRH) connected by a first radio frequency (RF) path to a first antenna system of a cell site, wherein the first RF path supports a first plurality of RF channels for air-interface communications with one or more user equipment device (UEs) via the first antenna system;
a second communication interface to a second RRH connected by a second RF path to a second antenna system of the cell site, wherein the second RF path supports a second plurality of RF channels for air-interface communications with one or more UEs via the second antenna system;
one or more processors, and memory storing instructions that, when executed by the one or more processors, cause the base station to carry out operations including:
making a determination that attenuation of antenna transmission power of a particular channel of the second plurality of RF channels exceeds attenuation of antenna transmission power of a particular channel of the first plurality of RF channels by more than a difference threshold;
in response to the determination, identifying one or more other channels of the second plurality of RF channels for which capacity loading for serving UEs is below a utilization threshold;
issuing an instruction to cause the second RRH to remove the identified one or more other channels from service; and
instructing the second RRH to redistribute transmission power of the removed one or more other channels to the particular channel of the second plurality of RF channels to boost the transmission power of the particular channel of the second plurality of RF channels.

16. The base station of claim 15, wherein the particular channel of the first plurality of RF channels corresponds to a first RF carrier and the particular channel of the second plurality of RF channels corresponds to a different, second RF carrier, wherein the first RF carrier and the second RF carrier are, respectively, primary and secondary carrier components of downlink carrier aggregation for a given UE, and wherein making the determination comprises receiving a reporting message from the given UE indicating that the given UE is detecting the downlink power of the second RF carrier below a detection threshold.

17. The base station of claim 15, wherein the particular channel of the first plurality of RF channels corresponds to a first RF carrier and the particular channel of the second plurality of RF channels corresponds to a different, second RF carrier, the first and second RF carriers being part of a common RF carrier band, and wherein making the determination comprises determining that a rate of handovers of UEs from the second RF carrier to the first RF carrier exceeds a rate threshold.

18. The base station of claim 15, wherein identifying the one or more other channels of the second plurality of RF channels for which capacity loading for serving UEs is below the utilization threshold comprises monitoring capacity loading of at least a subset of the second plurality of RF channels.

19. The base station of claim 18, wherein each of the first plurality of RF channels corresponds to a respective RF carrier of a first plurality of RF carriers, and each of the second plurality of RF channels corresponds to a respective RF carrier of a second plurality of RF carriers, wherein issuing an instruction to cause the second RRH to remove the identified one or more other channels from service comprises issuing an instruction to cause the second RRH to disable those RF carriers of the second plurality of RF carriers that correspond to the identified one or more channels; and wherein, instructing the second RRH to redistribute transmission power of the removed one or more other channels to the particular channel of the second plurality of RF channels comprises instructing the second RRH to increase transmission power of a particular RF carrier of the second plurality RF carriers that corresponds to the particular channel of the second plurality of RF channels by applying at least a portion of power previously allocated to the disabled RF carriers.

20. The base station of claim 15, wherein the wireless communication system is configured to operate according to at least Long Term Evolution (LTE) and Code Division Multiple Access (CDMA), and the base station is an eNodeB, wherein the wireless communication system further comprises a base station controller (BSC),
and wherein each of the first plurality of RF channels corresponds to a respective RF carrier of a first plurality of RF carriers, and one or more of the first plurality of RF channels, including the particular RF channel of the first plurality of RF channels, is configured for transmitting according to LTE,
wherein each of the second plurality of RF channels corresponds to a respective RF carrier of a second plurality of RF carriers, the second plurality of RF carriers being different than the first plurality of RF carriers, one or more of the second plurality of RF channels, including the particular RF channel of the second plurality of RF channels, is configured for transmitting according to LTE, and one or more of the second plurality of RF channels is configured for transmitting according to CDMA;

wherein identifying the one or more other channels of the second plurality of RF channels for which capacity loading for serving UEs is below the utilization threshold comprises the eNodeB monitoring the capacity loading of one or more of the second plurality of RF channels;

wherein the eNodeB monitoring the capacity loading of one or more of the second plurality of RF channels comprises the eNodeB determining at least one of: the capacity loading of the one or more of the second plurality of RF channels configured for transmitting according to LTE, or the capacity loading reported by the BSC of the one or more of the second plurality of RF channels configured for transmitting according to CDMA;

wherein removing the identified one or more other channels from service comprises the eNodeB instructing at least one of: the second RRH to disable those RF carriers of the second plurality of RF carriers that correspond to the identified one or more channels, or the BSC to direct the second RRH to disable those RF carriers of the second plurality of RF carriers that correspond to the identified one or more channels; and wherein, at the second RRH, redistributing transmission power of the removed one or more other channels to the particular channel of the second plurality of RF channels comprises the eNodeB directing the second RRH to increase transmission power of a particular RF carrier of the second plurality RF carriers that corresponds to the particular channel of the second plurality of RF channels by applying at least a portion of power previously allocated to the disabled RF carriers.

* * * * *